(12) United States Patent
Lundblad

(10) Patent No.: US 7,647,853 B2
(45) Date of Patent: Jan. 19, 2010

(54) METAL CUTTING APPARATUS AND METHOD FOR DAMPING FEED-BACK VIBRATIONS GENERATED THEREBY

(75) Inventor: Mikael Lundblad, Gävle (SE)

(73) Assignee: Sandvik Akiebolag, Sandviken (SE)

( * ) Notice: Subject to any disclaimer, the term of this patent is extended or adjusted under 35 U.S.C. 154(b) by 160 days.

(21) Appl. No.: 11/178,335

(22) Filed: Jul. 12, 2005

(65) Prior Publication Data

US 2005/0262975 A1 Dec. 1, 2005

Related U.S. Application Data

(63) Continuation of application No. 10/851,099, filed on May 24, 2004, now abandoned, which is a continuation of application No. 10/006,713, filed on Dec. 10, 2001, now abandoned.

(30) Foreign Application Priority Data

Dec. 8, 2000 (SE) .................................. 0004540

(51) Int. Cl.
*B23B 3/00* (2006.01)
*B23B 25/00* (2006.01)

(52) U.S. Cl. .................. 82/1.11; 82/163; 82/904; 409/141; 408/143

(58) Field of Classification Search .............. 408/143; 82/163, 904, 1.11; 409/141; 407/48, 40, 407/53, 103, 33, 34, 64
See application file for complete search history.

(56) References Cited

U.S. PATENT DOCUMENTS

| | | | |
|---|---|---|---|
| 3,837,758 A * | 9/1974 | Streicher | 408/143 |
| 3,967,515 A | 7/1976 | Nachtigal et al. | |
| 4,849,668 A | 7/1989 | Crawley et al. | |
| 5,239,789 A | 8/1993 | Uno et al. | |
| 5,416,597 A * | 5/1995 | Mubaslat | 358/3.29 |
| 5,485,053 A | 1/1996 | Baz | |
| 5,558,477 A * | 9/1996 | Browning et al. | 408/143 |
| 5,913,955 A * | 6/1999 | Redmond et al. | 82/1.11 |
| 6,241,435 B1 * | 6/2001 | Huang et al. | 409/141 |
| 6,443,673 B1 * | 9/2002 | Etling et al. | 408/1 R |
| 6,661,157 B1 | 12/2003 | Lundblad | |

FOREIGN PATENT DOCUMENTS

DE 26 05 476 8/1977

(Continued)

OTHER PUBLICATIONS

Ashley, Steven "Smart Skis and Other Adaptive Structures", Mechanical Engineering (Nov. 11, 1995; pp. 77-81).

(Continued)

*Primary Examiner*—Willmon Fridie
(74) *Attorney, Agent, or Firm*—Drinker Biddle & Reath LLP

(57) ABSTRACT

Feed back vibrations of a metallic tool generated during the machining of metallic workpieces are damped by detecting an oscillatory motion of the tool, identifying a frequency of the oscillatory motion and generating a mechanical camping force having the same frequency as the oscillatory motion and applied to the tool in counter-direction to a velocity of the oscillatory motion. The damping force can be of constant amplitude or gradually decreasing amplitude.

15 Claims, 6 Drawing Sheets

FOREIGN PATENT DOCUMENTS

| | | |
|---|---|---|
| DE | 199 25 193 | 10/2000 |
| EP | 0 196 502 | 10/1986 |
| EP | 0 297 608 | 1/1989 |
| JP | A-63-180401 | 7/1988 |
| SE | 514 525 | 10/1998 |
| SE | 515 157 | 10/1998 |
| SE | A-9900441-8 | 8/2000 |
| WO | WO 00/25964 | 5/2000 |
| WO | WO 00/47408 | 8/2000 |

OTHER PUBLICATIONS

Stephenson and Agapiou; Metal Cutting Theory and Practice, Marcel Dekker Inc., 1997, ISBN:0-8247-9579-2, pp. 728-750.

* cited by examiner

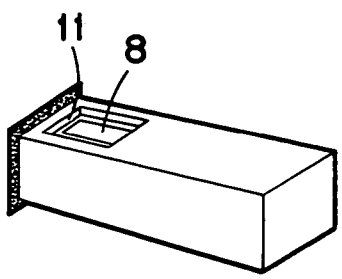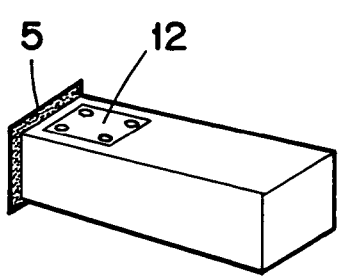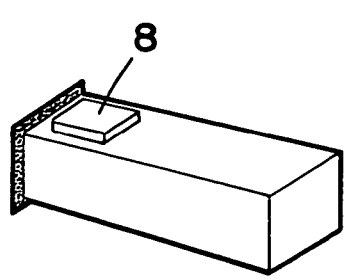
Fig. 6　　　　Fig. 7　　　　Fig. 8
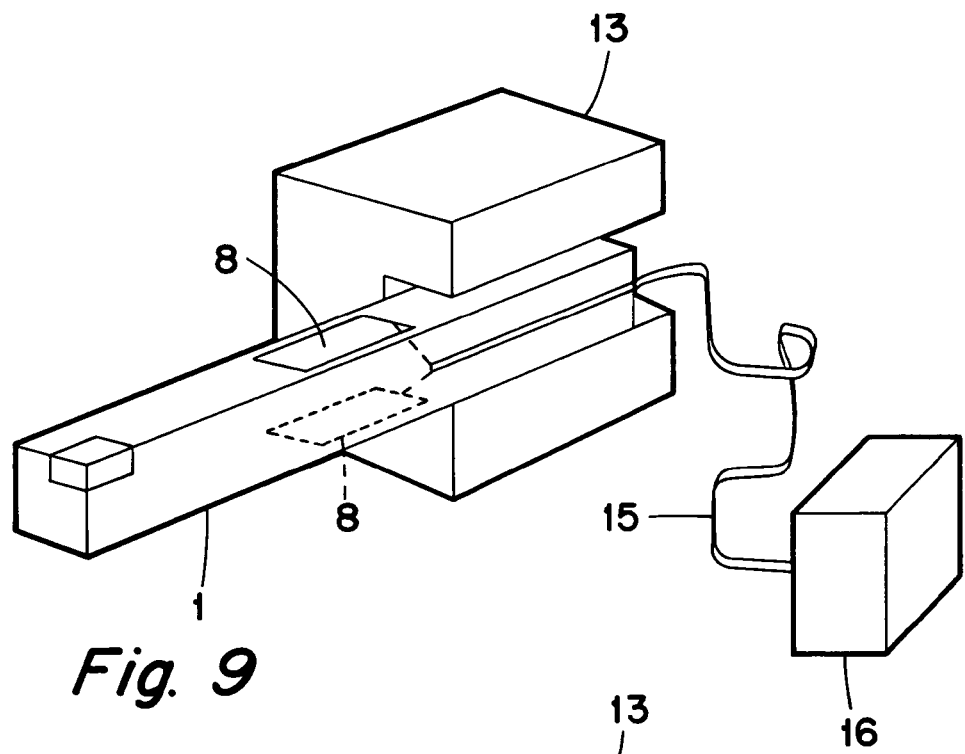
Fig. 9
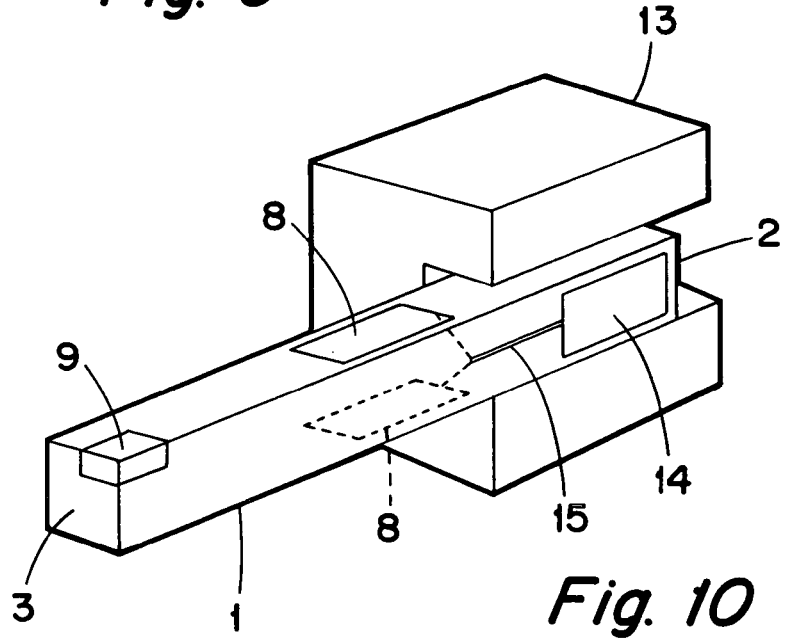
Fig. 10

METAL CUTTING APPARATUS AND METHOD FOR DAMPING FEED-BACK VIBRATIONS GENERATED THEREBY

RELATED INVENTIONS

This application is a continuation of U.S. application Ser. No. 10/851,099 filed on May 24, 2004 now abandoned, and which is a continuation of U.S. application Ser. No. 10/006,713 filed on Dec. 10, 2001, now abandoned, respectively.

This application claims priority under 35 U.S.C. §§ 119 and/or 365 to Patent Application Serial No. 0004540-1, filed in Sweden on Dec. 8, 2000.

TECHNICAL FIELD OF THE INVENTION

The present invention relates to the damping of feed-back vibrations generated by a metal cutting tool during the chip-removing machining of metal. In particular, the invention relates to a method of such damping which involves:
- detecting the tool's oscillatory motion by means of a sensor device associated with a control device,
- identifying the oscillatory motion's frequency, amplitude and phase by means of the control device, and
- by means of the control device, actuating a vibration damping device, so that the same renders a mechanical damping force with substantially the same frequency as the tool's oscillatory motion.

The invention also relates to a vibration damper and a mechanical apparatus for performing the method.

BACKGROUND

Metallic tools for chip-forming machining can be exposed to vibrations induced by either forces or regenerative oscillations (i.e., feed-back vibrations); see "Metal Cutting Theory and Practice" by Stephenson and Agapiou; publisher Marcel Dekker Inc.; ISBN: 0-8247-9579-2. According to this document, vibrations induced by forces are generated by transient cutting forces, whereas regenerative vibrations (also called chatter or oscillations) occur because the dynamic cutting process forms a closed loop. The present invention relates to the damping of only regenerative oscillations (also called self-induced vibrations or feedback vibrations).

Regenerative vibration is so named because of the closed-loop nature of the dynamic cutting process. Each tool pass leaves disturbances in the form of undulations on the workpiece due to the vibrations of the tool and workpiece, and those disturbances produce mechanical feedback vibrations in subsequent passes of the tool. Thus, regenerative vibration can be described as a small transient wave that is machined into the workpiece. That small wave will become the driving force, causing the system to vibrate increasingly again in subsequent passes, i.e., the vibrations from one pass are amplified by those of the next pass. Unstable conditions can cause a small wavelet to develop and increase around the circumference, giving non-acceptable machining results.

Damping of vibration in tools for chip removing machining has previously been achieved by pure mechanical damping, i.e., the tool shaft being formed with a cavity in which is disposed a counter-oscillating mass of, for instance, heavy metal. The weight and location of the mass is tuned in order to provide damping of oscillations within a certain range of frequencies. The cavity is then filled with a viscous liquid, e.g. oil, and is plugged. However, this technique works passably only in those cases where the overhang of the shaft from a fastening device is approx. 4-10 times longer than the diameter thereof. In addition to this limitation, the pure mechanical damping has an obvious disadvantage in that the range of frequencies within which the damping acts, is very limited. An additional inconvenience consists of the strength-wise weakening of the shaft resulting from the presence of that cavity.

In entirely other areas of technology, the development of more efficient, adaptive damping techniques based on the utilization of, among other things, piezo elements has been started. A piezo element consists of a material, most often of a ceramic type, which when compressed or elongated in a certain direction (the direction of polarization), generates an electric field in the same direction. The piezo element usually has the shape of a rectangular plate having a direction of polarization, which is parallel to the major axis of the plate. By connecting the piezo element to an electric circuit, including a control module, and compressing or elongating the piezo element in the direction of polarization, an electric current will be generated and flow in the circuit. Electric resistive components included in the control module will generate heat according to known physics. In doing so, vibration energy is converted to thermal energy, whereby a passively damping, but not damping effect on the vibrations is obtained. Moreover, by forming the control module with a suitable combination of resistive and reactive components, so-called shunts, selected frequencies can be brought to be damped with particular efficiency. Advantageously, such frequencies are the so-called "own-frequencies" of the exposed "own-modes" of the object, which are those preferably being excited.

Conversely, a piezo element may be compressed or elongated by an electric voltage being applied over the piezo element; during which the same may be used as a control or operating device (actuator). This can be used for active vibration control by selecting the polarity of the applied electric voltage in such a way that the mechanical stress of the operating device acts in the opposite direction, as an external, mechanical stress. The emergence of vibrations is suppressed by the fact that another kinetic energy, for instance rotation energy, is prevented from being converted to vibration energy. In doing so, the synchronization of the applied electric voltage relative to the external mechanical stress, the effect of which is to be counteracted, takes place by supplying a feed-back signal from a deformation sensitive sensor to a control means in the form of a logical control circuit, e.g. a programmable micro-processor. The processor processes the signal to control the electric voltage applied over the operating device. The control function, i.e. the relation between the input signal from the sensor and the output voltage, may, in that connection, be made very complex. For instance, a self-learning system for adaptation to varying conditions is feasible. The sensor may consist of a separate, deformation sensitive device, e.g. a second piezo element, or be common with the operating device.

Examples of practical applications and present development areas for the utilization of piezo elements for vibration damping purposes, are described in Mechanical Engineering, November 1995, p. 76-81. Thus, skis for alpine skiing (K2 Four ski, K2 Corp., USA) have been equipped with piezo elements for the purpose of suppressing undesired vibrations, which otherwise decrease the contact with the ground, and thereby reduce the skier's prospects of a stable and controlled skiing. Furthermore, applications such as increased wing stability of aeroplanes, improved comfort in motor vehicles, suppression of vibrations in helicopter rotor blades and shafts, vibration control of process platforms for flexible manufacture, and increased accuracy of military weapons are mentioned. In information documents from Active Control eXperts (ACX) Inc., USA (a manufacturer of piezo elements), the vibration control of snowboards is also mentioned.

A method of the kind described in the introduction, as well as such a vibration damper and such a mechanical structure, respectively, is known from SE-A-9900441-8 (corresponding to U.S. application Ser. No. 09/913,271, the disclosure of which is hereby incorporated by reference herein).

This type of vibration damper is not suitable for force-induced vibrations. but only for regenerative, i.e. feed-back vibrations, which, e.g., arise in a tool during mechanical machining when a small disturbance gives a mechanical feed-back in the tool. Such a mechanical feed-back may cause an increasing oscillatory motion, and thereby an undesired uneven surface of the machined blank and reduced service life of the tool.

While SE-A-9900441-8 does not explicitly describe how to apply the damping force to the mechanical structure, the hitherto known way to dampen an oscillatory motion has been to generate a counter force in phase with the oscillatory motion. This procedure works well as long as low frequencies are concerned. At higher frequencies, i.e. above approximately 500 Hz, it is difficult to apply a counter force without phase errors. If a phase error arises, there is a risk of the oscillatory motion and the damping force ending up in an unbalanced state, and thereby partly amplifying each other, which in turn may lead to the oscillatory motion not being quenched to the desired degree. Thus, a presumption for such a vibration damping to work is that the counter-directed force is in phase with the oscillatory motion with a high degree of accuracy.

Other piezoelectric dampers are described in SE-A-9803605-6, SE-A-98003606-4, SE-A-9803607-2, U.S. Pat. No. 4,849,668, DE-A-199 25 193, EP-A-0 196 502, U.S. Pat. No. 5,485,053 and JP-A-63180401.

During chip removing machining, such as turning or drilling, it is not unrare for problems with vibrations to arise, particularly in cases in which the length of the shaft or tool outside the fastening device (a so-called overhang) is at least 3 times larger than the diameter thereof. One type of vibration is bending vibration, the shaft being curved to and fro and submitted to bending deformations. This phenomenon constitutes a common problem, for instance during turning, especially internal turning, where the shaft in the form of a boring bar has to be long in order to reach the area in the workpiece which is to be machined, at the same time as the diameter of the bar is limited by the dimension of the bore in which machining is carried out. During such drilling, turning and milling operations, where the distance to the workpiece is large, extenders are used, which frequently causes bending vibrations which not only lead to impaired dimensional accuracy and irregularities in the workpiece, but also to reduced service life of the tool and the cutting inserts or machining elements thereof.

SUMMARY OF THE INVENTION

The purpose of the present invention is to improve the control of a vibration-damping device for cutting tools having a regenerative oscillatory motion.

This has been attained by a method and a vibration damper, respectively, according to the kind described in the introduction, the control device of which being arranged to generate a damping force directed opposite to the cutting tool's oscillatory velocity. This means that the damping force gives the tool a deformation directed in the opposite direction to that of the tool's oscillatory motional velocity.

In this way, a damping of the regenerative motion is obtained without risk that the oscillations end up in imbalance, and thereby amplify the oscillatory motion. The invention does not require a high degree of accuracy as regards the phase relationship between the frequencies of the vibration and the imposed damping force, i.e. the damping force should constantly resist the velocity and in order to obtain a maximum damping effect, a maximum damping force is imposed all the time. However, it is of minor importance with a maximum force at the oscillatory motion's end points, since the velocity there is low. Thus, it is important that the damping effect is greater than the contribution from the cutting process so that the regenerative oscillation is damped out and a smooth cutting process is obtained by means of the mechanical structure, e.g. a turning shaft or a boring bar.

Preferably, the control device is arranged to impose the damping force out of phase by 60°-120° alternatively 240°-300° in relation to the oscillatory motion. Suitably, the control device is arranged to impose the damping force out of phase by 70°-110° alternatively 250°-290° in relation to the oscillatory motion. Preferably, the control device is arranged to impose the damping force out of phase by 80°-100° alternatively 260°-280° in relation to the oscillatory motion. In this way, a faster damping of the oscillatory motion is obtained. Best results are achieved when the control device is arranged to impose the damping force out of phase by 90° alternatively 270° in relation to the oscillatory motion.

A co-directed force should be given when the same is imposed out of phase between 60° and 120° in relation to the oscillatory motion, while a counter directed force should be imposed out of phase between 240° and 300° in relation to the oscillatory motion.

Preferably, the control device is arranged to give a damping force in the area of 50-1500 Hz.

Suitably, at least one piezoelectric element is included in the vibration-damping device. Alternatively, the vibration-damping device may be a hydraulic or pneumatic cylinder or an electromagnetic device.

Preferably, said mechanical structure comprises a tool for chip removing machining.

BRIEF DESCRIPTION OF THE DRAWINGS

In the following, preferred embodiments of the invention will be described in detail, reference being made to the accompanying drawings, where:

FIGS. 6-8 are perspective views of respective tool shafts having a square cross-section and in different alternative embodiments, wherein FIG. 6 shows a piezo element mounted in a countersink of a tool draft; FIG. 7 shows the countersink of FIG. 6 covered by a lid; FIG. 8 shows a piezo element mounted on the outside of the shaft.

FIG. 9 is a perspective view of a tool for active vibration damping mounted in a carrier.

FIG. 10 is an analogous perspective view of an alternative embodiment for passive vibration damping.

FIGS. 12-13 show schematically the damping of an oscillatory motion according to the invention, wherein FIG. 12 shows the application of a constant-amplitude damping force, whereas FIG. 13 discloses the application of a damping force having a gradually diminishing amplitude.

DETAILED DESCRIPTION OF PREFERRED EMBODIMENTS OF THE INVENTION

Figure 1:
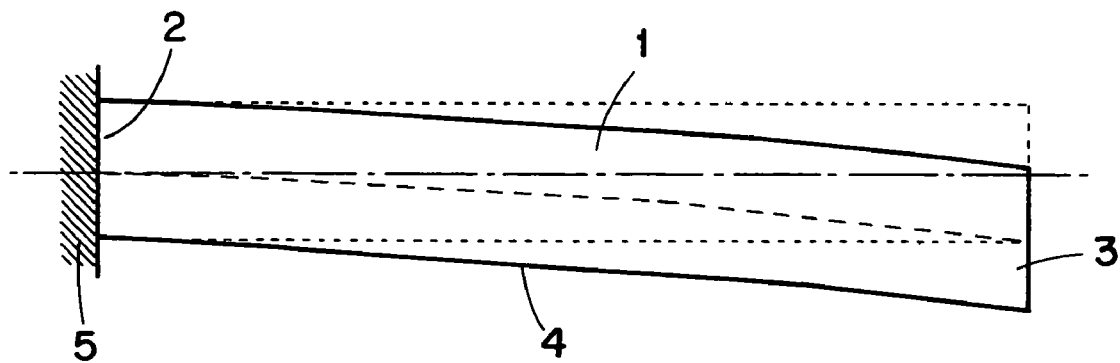
FIG. 1 is a schematic side view of a long narrow body in the form of a tool shaft during bending, deformation at oscillation ($1^{st}$ resonance frequency).

In FIG. 1, a long narrow body in the form of a bar or a shaft 1 of a tool is illustrated, which is intended to carry one or more (cutting) inserts of the tool during turning or milling. The body 1 has a fastening end 2 and a free, external end 3. The body has an external surface 4, which may be cylindrical or comprise a plurality of plane surfaces if the body has a polygonal, e.g. rectangular cross-section shape. The body 1 may have an arbitrary cross-section shape, however, most commonly circular or rectangular. In FIG. 1, numeral 5 designates a part in which the body 1 is fastened, the body extending cantilever-like from the fastening part. In FIG. 1, the body 1 is shown in a state when the same has been deformed in a first self-bending state or "own-mode."

Figure 2:
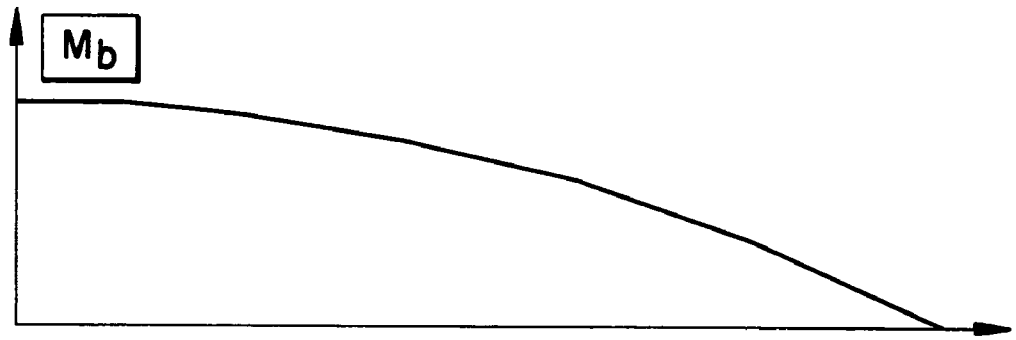
FIG. 2 is a graph showing the bending torque in the body.

Furthermore, in FIG. 2 a graph is shown which illustrates how the bending torque $M_b$ in this case varies along the body. As is seen in the graph, a maximum bending moment arises, and thus a maximum axial elongation, at or near the fastening end 2. The same is valid for all lower modes, which are normally energy-wise dominant during bending vibrations of tools for chip removing machining.

Figure 3:
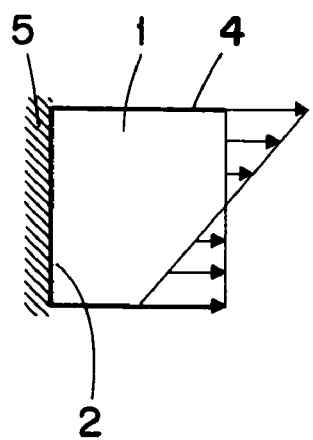
FIG. 3 a side view of a cut end portion of the body in connection with a fastening end so as to illustrate the stress in the body during bending deformation proportional to elongation.

In FIG. 3, a portion of the body 1 deformed by bending in FIG. 1 is shown in the area of the fastening end. In this connection, how the elongation at bending deformation varies in the cross-direction of the body (the elongation is strongly exaggerated for illustrative reasons) is illustrated. As is seen in the FIGURE, the maximum elongations are obtained at the envelope surface or external surface 4 of the body.

Figure 4:
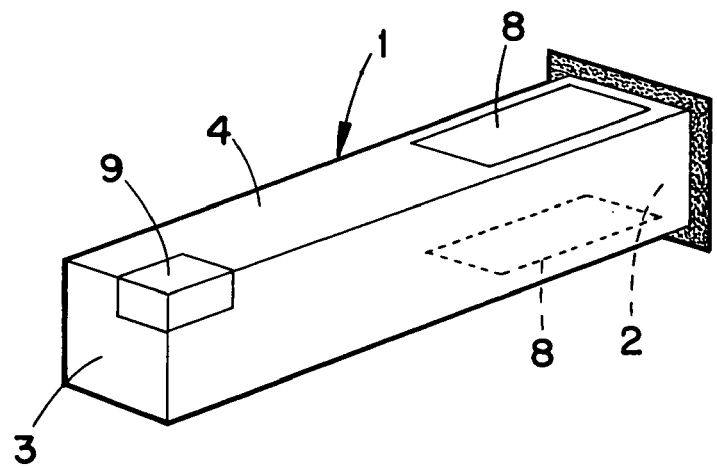
FIG. 4 is a transparent perspective view of a tool shaft.

In FIG. 4, a fundamental design of a bar or a shaft 1 is schematically shown in which two plate-formed, rectangular piezo elements 8 are fastened on opposite, longitudinal plane surfaces 4 of the shaft of rectangular cross-section. The piezo elements 8 are placed in the area near the fastening end 2 of the shaft. At the external end 3 thereof, the shaft has a machining element in the form of a cutting insert 9. Thus, the piezo elements 8 are positioned in an area where the maximum axial elongation occurs during bending deformation. Although this location is preferred, also other locations are feasible. Furthermore, the piezo elements 8 are oriented with the major faces thereof essentially parallel to the plane surfaces 4 of the bar or shaft 1 and with the major axes essentially parallel to the longitudinal axis of the shaft or bar 1, at which the piezo elements 8 at bending vibration will be deformed while retaining the rectangular shape.

Figure 5:
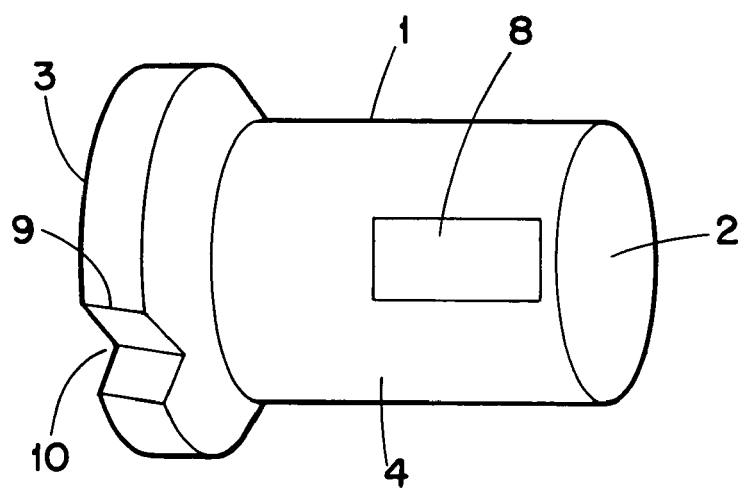
FIG. 5 is a perspective view of a bar extender for milling tools formed with a circular cross-section.

In FIG. 5, an embodiment is shown in which the body 1 consists of a cylindrical bar extender intended for a milling tool. In this case, a chip forming machining element 9 in the form of a cutting edge is formed adjacent to a chip pocket 10 at the free end 3 of the bar extender. A piezo element 8 is attached on the envelope surface 4 of the bar extender in an area near the fastening end 2. The major axis of the piezo element is parallel to the length extension of the bar extender. Consequently, with this orientation, the piezo element 9 acts also here most efficiently for the damping of bending vibration.

For simultaneous damping of bending and torsional vibrations, the shaft of the tool is advantageously formed with a plurality of piezo elements, some of which being oriented with the long sides thereof essentially parallel to the length extension of the shaft, while others are oriented at approximately a 45° angle. Alternatively, one or more piezo elements are provided having different respective orientations.

Piezo elements are usually fragile, particularly such of the ceramic type. Therefore, in demanding environments, the same should have some form of protection in order to achieve art acceptable service life.

In FIGS. 6-8, tool shafts having a rectangular cross-section are shown, the piezo element 8 being attached and protected in alternative ways. In all cases, the piezo elements are placed in an area near the fastening part 5 (which part may consist of a conventional clamping unit in which the tool is detachably mounted).

In FIG. 6, the piezo element 8 is mounted in a countersink 11 and advantageously covered by a protection layer, for instance of the epoxy type.

In FIG. 7, the piezo element is assumed to be mounted in the countersink 11 and covered by a stiff lid 12.

In FIG. 8, the piezo element 8 is mounted to, e.g. glued on, the outside of the shaft. These alternatives should only be seen as examples, those of which shown in FIGS. 6 and 7 being preferred. It should be understood that the same type of protection for the piezo elements is independent of the cross-section shape of the tool shaft.

The piezo elements co-operate with means for electric control or guiding of the same. In FIGS. 9 and 10, examples are shown of how the tool 1 has been formed with such control means. In these cases, the tool is mounted in a carrier 13. In FIG. 10, a control means for damping is shown in the form of a control means 14 formed near the fastening end 2 and an electric connection 15, via which one or more piezo elements 8 are connected to the control module 14 for separate or common control of respective piezo elements. This module 14 comprises at least electric resistive components. Preferably, the control module 14 also comprises one or more shunts, at which selected frequencies may be damped particularly efficiently.

FIG. 9 illustrates a control means for active damping in the form of a free-standing logical control circuit 16, e.g. a programmable microprocessor, for separate or common control of (via the schematically illustrated electric connection 15) voltages applied over the piezo elements 8. In practice, the connection 15 may in this case comprise collector shoes or the like.

Also, if the piezo elements 8 in the embodiment exemplified in FIG. 10 for active damping simultaneously act as both operating devices and sensors, it is feasible to realise the same two functions by separate operating devices and sensors, wherein the sensors do not need to consist of piezo elements. Although the depicted locations of the control module 14 and logic control circuit 16, respectively, are preferred, other locations are feasible. For instance, it is feasible, as in the case of the logic control circuit 16, to arrange the control module 14 freestanding from the tool. The advantage of placing the control module 14 in the vicinity of the fastening end is that the module becomes simple to connect to the piezo elements, whereas the advantage of arranging it at a freestanding position is that it becomes easier to protect the module against harmful mechanical effects.

Through the usage of piezo elements as vibration dampers, a robust tool for chip removing machining is obtained having a possibility of active damping of bending vibrations over a wide range of frequencies. Furthermore, a tool is provided which on one hand has a longer service life for the tool in itself as well as the cutting or machining elements thereof, and on the other hand provides increased quality of the surface on the machined workpiece. In addition, an improved working environment is attained by the reduction of high frequency noise compared with previously known tools.

Figure 11:
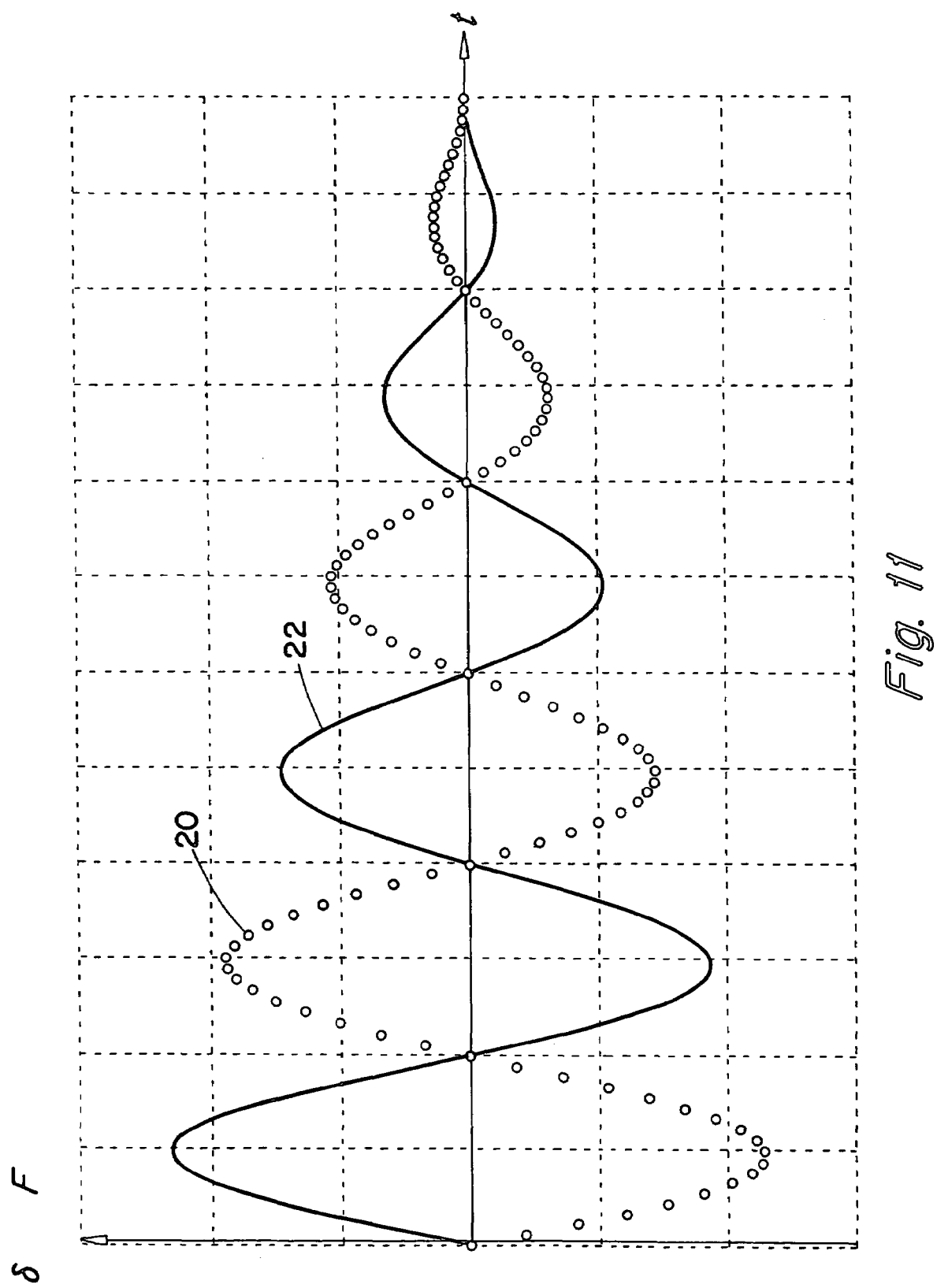
FIG. 11 shows schematically the damping of an oscillatory motion by means of a counter force in phase with the oscillation.

FIG. 11 shows schematically how damping of an undesired oscillatory motion in a mechanical structure generally comes about according to afore-mentioned U.S. Ser. No. 09/913,271. If a damping force 20 is counter-directed to, and in phase with, the oscillatory motion 22, the motion is quickly dampened. However, this requires a very large accuracy as regards phase correctness. If a phase error arises between the damping force and the oscillatory motion, the counter-directed dampening force will be partly co-directed with the oscillatory motion, which may lead to the oscillatory motion not being quenched to the desired degree.

Figure 12:
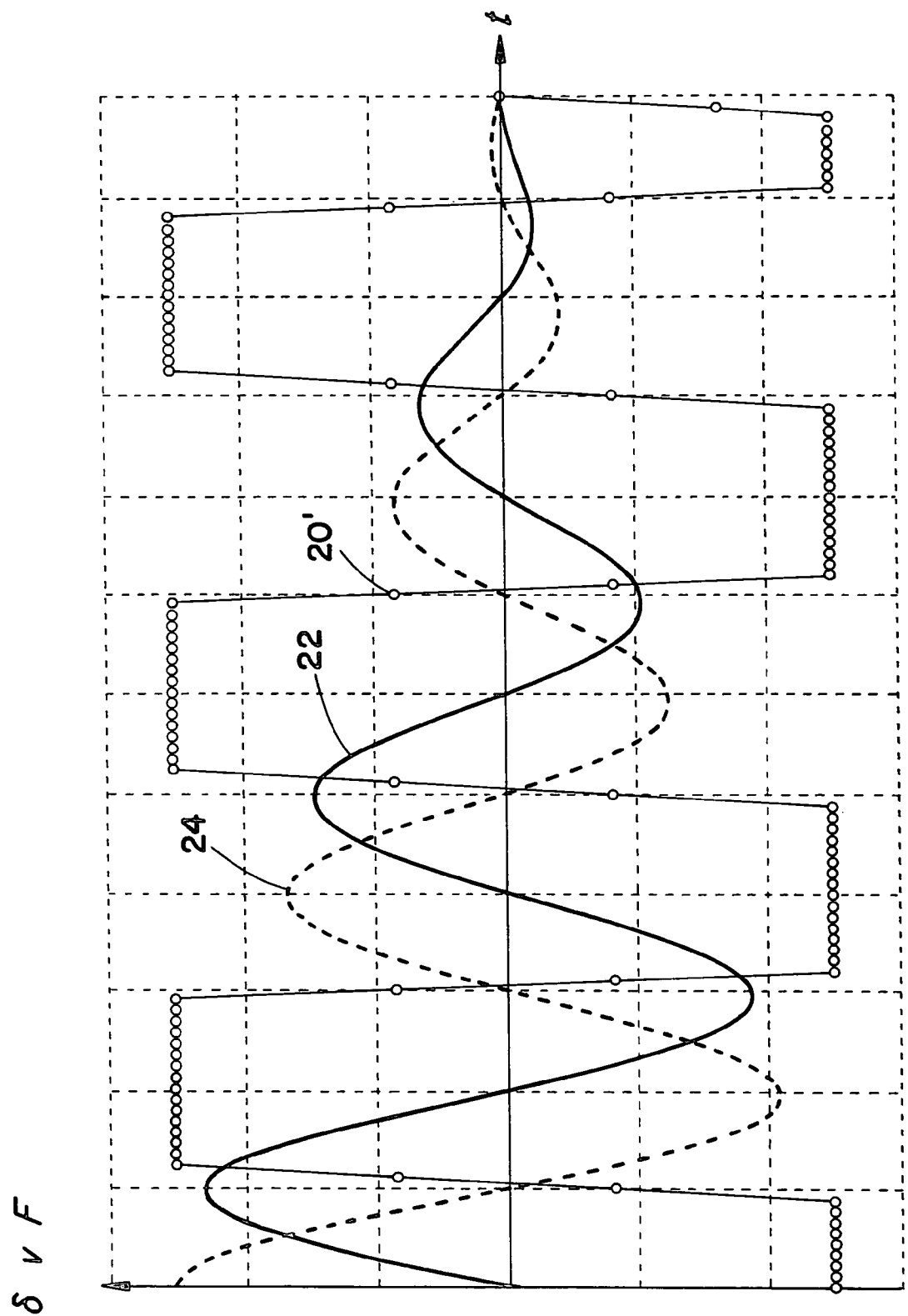

FIG. 12 shows schematically the damping of the oscillatory motion of the mechanical structure according to the invention. The sensor detects the oscillatory motion 22. The signal is transferred to the control device, which processes the signal and determines the oscillatory motion's phase by defining positive and negative, respectively, zero crossing, The control device also calculates the amplitude and frequency of the oscillation.

The control device then sends out a control signal to the vibration damper (actuator), which generates a force 20' counter-directed relative to the tool's velocity 24. The phase is displaced a quarter of, alternatively three-quarters of, a wavelength in relation to the oscillatory motion.

Since the damping force is applied in counter-direction to the velocity of the oscillatory motion, the damping force will tend to deform the tool in that counter direction. Accordingly, regenerative vibration can be damped without a risk that the damping force will amplify the vibration, e.g., the result of an unbalanced relationship therebetween. The invention thus eliminates a need for a high degree of accuracy between the phases of the damping force frequency and the regenerative vibration frequency.

Figure 13:
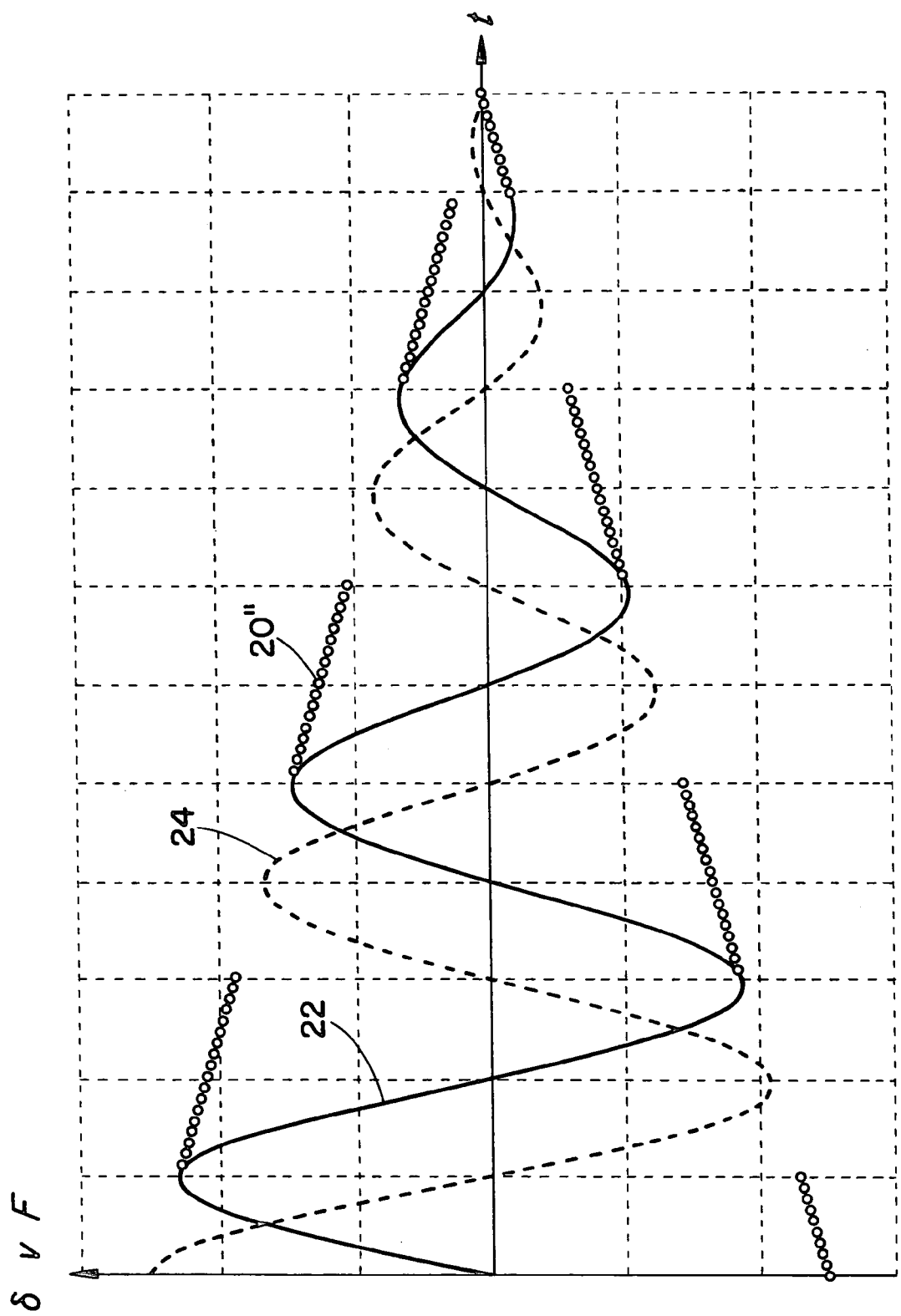

In FIG. 13, it is shown how a counter force 20" directed in the opposite direction to that of the tool's oscillatory motion 22 can be imposed at gradually decreasing oscillation amplitude (in lieu of constant amplitude) to avoid a new generation of vibrations, and is thereby easier to control.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

The invention claimed is:

1. A method for damping feed-back vibrations of a metallic tool during the chip removing machining of a metal workpiece comprising the steps of:
   A. causing a sensor device to detect an oscillatory motion of the tool;
   B. causing a control device to identify the frequency of the oscillatory motion detected in step A; and
   C. causing a vibration damping device to generate a mechanical damping force having substantially the same frequency as the frequency identified in step B and applied to the tool in counter-direction to a velocity of the oscillatory motion and out-of-phase therewith by other than 180 degrees.

2. The method according to claim 1 wherein step C includes applying the damping force to the tool out of phase by 60°-120° relative to the oscillatory motion.

3. The method according to claim 1 wherein step C includes applying the damping force to the tool out of phase by 240°-300° relative to the oscillatory motion.

4. The method according to claim 1 wherein step C includes applying the damping force to the tool out of phase by 70°-110° relative to the oscillatory motion.

5. The method according to claim 1 wherein step C includes applying the damping force to the tool out of phase by 250°-290° relative to the oscillatory motion.

6. The method according to claim 1 wherein step C includes applying the damping force to the tool out of phase by 80°-100° relative to the oscillatory motion.

7. The method according to claim 1 wherein step C includes applying the damping force to the tool out of phase by 260°-280° relative to the oscillatory motion.

8. The method according to claim 1 wherein step C includes applying the damping force to the tool out of phase by 90° relative to the oscillatory motion.

9. The method according to claim 1 wherein step C includes applying the damping force to the tool out of phase by 270° relative to the oscillatory motion.

10. The method according to claim 1 wherein the damping force generated in step C is in the range of 50-1500 Hz.

11. The method according to claim 1 wherein step C includes causing a piezo element of the mechanical damping device to generate the damping force.

12. The method according to claim 1 wherein step C includes causing a hydraulic cylinder of the mechanical damping device to generate the damping force.

13. The method according to claim 1 wherein step C includes causing a pneumatic cylinder of the mechanical damping device to generate the damping force.

14. The method according to claim 1 wherein step C includes causing an electromagnetic device of the mechanical damping device to generate the damping force.

15. The method according to claim 1 wherein step B further includes causing the control device to identify an amplitude of the oscillatory motion, and wherein the mechanical damping force generated by the vibration damping device is of gradually decreasing amplitude.

\* \* \* \* \*